United States Patent
Olsson et al.

(10) Patent No.: US 7,240,491 B2
(45) Date of Patent: *Jul. 10, 2007

(54) TURBOCOMPOUND INTERNAL COMBUSTION ENGINE ARRANGEMENT

(75) Inventors: Göran Olsson, Göteborg (SE); Henrik Ask, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 356 days.

This patent is subject to a terminal disclaimer.

(21) Appl. No.: 10/708,269

(22) Filed: Feb. 20, 2004

(65) Prior Publication Data

US 2006/0191264 A1    Aug. 31, 2006

Related U.S. Application Data

(63) Continuation of application No. PCT/SE02/01342, filed on Jul. 4, 2002.

(30) Foreign Application Priority Data

Aug. 20, 2001    (SE) ..................... 0102769

(51) Int. Cl.
F02G 3/00    (2006.01)
F02B 41/10    (2006.01)
F02D 9/06    (2006.01)
F02D 3/00    (2006.01)

(52) U.S. Cl. .............................. 60/624; 60/614; 60/602

(58) Field of Classification Search .................. 60/624, 60/614, 602; F02B 41/10; F02D 9/06
See application file for complete search history.

(56) References Cited

U.S. PATENT DOCUMENTS

| 2,622,390 | A | * | 12/1952 | Newton | 60/624 |
| 4,748,812 | A |   | 6/1988  | Okada et al. | 60/624 |
| 4,800,726 | A | * | 1/1989  | Okada et al. | 60/624 |
| 4,843,822 | A | * | 7/1989  | Okada | 60/624 |
| 4,884,407 | A | * | 12/1989 | Hatanaka | 60/624 |
| 5,884,482 | A |   | 3/1999  | Lange et al. | 60/624 |
| 6,085,524 | A | * | 7/2000  | Persson | 60/602 |
| 6,085,525 | A | * | 7/2000  | Hakansson | 60/602 |
| 6,810,850 | B2 | * | 11/2004 | Anderson et al. | 123/323 |
| 6,895,753 | B2 | * | 5/2005  | Larsson et al. | 60/624 |

FOREIGN PATENT DOCUMENTS

| DE | 19743751 A1 | * | 4/1998 |
| SE |   507506 C2 |   | 6/1998 |
| SE |   516582 C2 |   | 1/2002 |
| WO | WO 2006072339 A1 | * | 7/2006 |

* cited by examiner

*Primary Examiner*—Thai-Ba Trieu
(74) *Attorney, Agent, or Firm*—Novak Druce + Quigg, LLP

(57) ABSTRACT

Method and arrangement for a turbocompound type internal combustion engine including an exhaust system for ducting the engine's exhaust gases. A supercharger turbine drives a compressor for the engine's combustion air, and an exhaust turbine is placed in the exhaust system downstream of the supercharger turbine for extracting residual energy from the exhaust flow via transmission to the combustion engine's crankshaft. The exhaust system also has an exhaust braking throttle placed downstream of the exhaust turbine. The exhaust braking throttle includes a pressure-controlled exhaust pressure regulator that makes possible variable regulation of an exhaust braking pressure in at least two steps.

4 Claims, 2 Drawing Sheets

TURBOCOMPOUND INTERNAL COMBUSTION ENGINE ARRANGEMENT

CROSS REFERENCE TO RELATED APPLICATIONS

The present application is a continuation patent application of International Application No. PCT/SE02/01342 filed 4 Jul. 2002 which was published in English pursuant to Article 21(2) of the Patent Cooperation Treaty, and which claims priority to Swedish Application No. 0102769-7 filed 20 Aug. 2001. Both applications are expressly incorporated herein by reference in their entireties.

BACKGROUND OF INVENTION

1. Technical Field

The present invention relates to an arrangement for an internal combustion engine of the turbocompound type and that includes an exhaust system for ducting the engine's exhaust gases. A supercharger turbine drives a compressor for the engine's combustion air and an exhaust turbine is also included that is located in the exhaust system downstream of the supercharger turbine for extracting residual energy from the exhaust flow via transmission to the crankshaft of the internal combustion engine. The exhaust system also includes an exhaust braking throttle located downstream of the exhaust turbine.

2. Background Art

In a turbocompound engine (TC engine), power is transmitted from the power turbine of the TC unit, via a gear mechanism, down to the engine's crankshaft. This power is obtained by extracting the residual energy that remains in the engine's exhaust gases after having passed through the turbo compressor for compressing the engine's charging air.

For engine braking, it is normal for an exhaust brake to be used. For a TC engine, the exhaust brake consists of a suitable arrangement, normally a throttle valve that can throttle the exhaust flow, and it is placed downstream of the TC unit. When the valve is closed and the fuel injection ceases, power is transmitted instead from the crankshaft via a gear to the TC unit's power turbine. This power helps to increase the braking effect as it is an energy loss, but which is positive from a braking perspective. A problem that can arise, however, is that a valve that has been closed downstream of the TC unit will increase the density of the air in which the TC unit's power turbine is operating. This, of course, assists the braking, but it also gives rise to increased thermal and mechanical stresses. These increased stresses will depend upon the engine speed and will increase with increased engine speed. In order that the TC unit or other components do not break, they must be dimensioned for the increased stresses. This can lead to the construction being unnecessarily expensive, as it is made more complicated and as expensive heat-resistant material must be used.

With an exhaust brake, the braking effect increases for a given engine speed when the back pressure after the turbine increases. In order to obtain best braking function, as high as possible back pressure is desired. For a TC engine, this is particularly difficult, as the stresses that were mentioned above arise as a result of the back pressure increasing. For a given back pressure, the stresses also increase when the engine speed increases. In order that components do not break, they must be constructed so that they can withstand the stresses that arise at the maximal permitted engine brake speed. Alternatively, a lower back pressure can be selected. A lower back pressure can be presumed still to give acceptable braking performance at high engine speeds, but at low engine speeds the braking effect is commensurately low. Thus, in order to obtain a good braking effect at low engine speeds, high back pressure is required. This in turn leads to large forces at high engine speeds, or alternatively using low back pressures at a high engine speed and obtaining a poor braking effect at low engine speeds.

SUMMARY OF INVENTION

An object of the invention is therefore to achieve an arrangement that makes possible rapid and effective regulation of the exhaust back pressure during engine braking.

This object is achieved by a means for braking that is configured *so that the exhaust braking throttle comprises (includes, but is not limited to) a pressure-controlled exhaust pressure regulator that makes possible variable regulation of an exhaust braking pressure in at least one step in addition to "off" and "on" steps. Furthermore, the exhaust pressure regulator is provided with means for adapting the exhaust braking pressure to the engine speed. By means of this solution, it is possible to optimize the braking effect for all engine speeds without being forced to select expensive constructional solutions. At low engine speeds, a high back pressure is selected that gives acceptable braking effect and acceptable stresses. At high engine speeds, a lower back pressure is selected that gives acceptable stresses and acceptable braking effect. With this solution, the braking effect can thus be optimized for the selected constructional solution and the selected material over the entire range of engine speeds. This means in principle that for each engine speed there is a unique back pressure that gives maximal braking effect without leading to the inducement of unacceptable stresses.

According to an advantageous embodiment of the invention, the exhaust pressure regulator is provided with means for adapting the exhaust braking pressure to the engine speed.

This object is achieved by a means for braking that is configured so that the exhaust braking throttle comprises (includes, but is not limited to) a pressure-controlled exhaust pressure regulator that makes possible variable regulation of an exhaust braking pressure in at least one step in addition to "off" and "on" steps. Furthermore, the exhaust pressure regulator is provided with means for adapting the exhaust braking pressure to the engine speed. By means of this solution, it is possible to optimize the braking effect for all engine speeds without being forced to select expensive constructional solutions. At low engine speeds, a high back pressure is selected that gives acceptable braking effect and acceptable stresses. At high engine speeds, a lower back pressure is selected that gives acceptable stresses and acceptable braking effect. With this solution, the braking effect can thus be optimized for the selected constructional solution and the selected material over the entire range of engine speeds. This means in principle that for each engine speed there is a unique back pressure that gives maximal braking effect without leading to the inducement of unacceptable stresses.

The exhaust pressure regulator consists suitably of a piston valve that comprises a first piston surface that is acted upon by the exhaust pressure when the exhaust braking throttle is closed, and a second opposing piston surface permanently connected to the first piston surface, which second piston surface is acted upon by a control pressure.

BRIEF DESCRIPTION OF DRAWINGS

The invention will be described in greater detail in the following, with reference to the embodiments that are shown in the attached drawings, in which.

DETAILED DESCRIPTION

Figure 1:
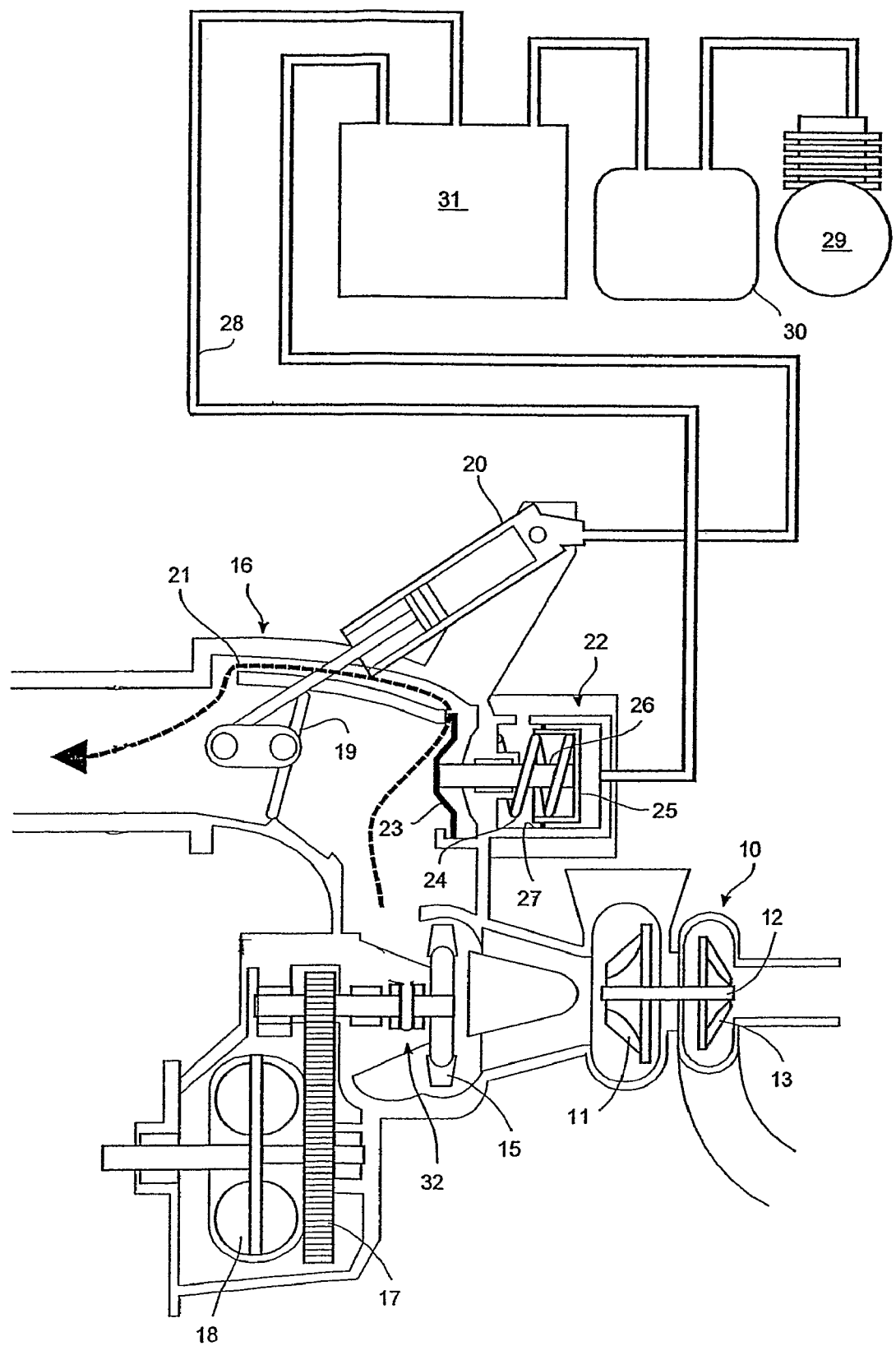
FIG. 1 is a schematic diagram showing a first embodiment of an arrangement configured according to the teachings of the present invention, and FIG. 2 schematically shows a second embodiment of an arrangement configured according to the teachings of the present invention.

The arrangement shown in the figures is configured for utilization with an essentially conventional internal combustion engine of the turbocompound type, preferably incorporated in the drive unit of a heavy truck or bus. The engine may advantageously be of the direct-injection diesel engine type in which a supercharger 10, with exhaust gas driven turbine 11 and compressor 13 arranged on the turbine shaft 12, are used for the compression and supply of combustion air. The inlet air is supplied to the compressor 13 for compression, after which the compressed air can be cooled during its passage through a charging air cooler before it enters the engine's inlet manifold.

The engine's exhaust gases are collected in the conventional way in an exhaust collector to be taken to the supercharger's 10 turbine 11 for driving the compressor 13. The exhaust gases are then taken via a second exhaust turbine, which in the embodiment shown consists of an axial turbine 15 and an exhaust brake arrangement 16, to a silencer unit with optional exhaust gas filter equipment.

The axial turbine 15 is used in turbocompound engines to extract residual energy from the exhaust gases after their passage through the supercharger's turbine. The exhaust gases drive the power turbine at very high speeds, up to approximately 90,000 rpm at a normal engine speed, which for a diesel engine for heavy trucks involves an engine speed of approximately 1,500–2,500 rpm. The torque that is obtained is transmitted to the crankshaft of the internal combustion engine via, among other things, a transmission 17 that gears down the speed, and a fluid coupling 18 that isolates the transmission 17 mechanically from the engine's crankshaft.

The exhaust brake arrangement 16 comprises a throttle 19 that can be moved between two end positions by means of a servo device 20, with the throttle rapidly changing between a completely open and a completely closed position. The exhaust brake arrangement comprises, in addition, a bypass 21 past the throttle 19, which bypass can be controlled by means of an exhaust brake regulator in the form of a piston valve 22 which is placed upstream of the throttle 19. A first piston surface 23 is acted upon by the exhaust pressure when the exhaust braking throttle is closed, with the piston surface 23 being pressed against the action of a helical spring 24, so that the bypass 21 is opened. A second piston surface 25 is permanently connected to the piston surface 23 via a rod 26 and is mounted in a cylinder 27 in such a way that it can be moved.

A regulating air pressure acts against the piston surface 25 via a compressed air pipe 28 which is connected to a compressed air system in the vehicle which is used to generate power for auxiliary units in the vehicle, for example the braking system and system for pneumatic operation of the vehicle's gearbox. This compressed air system comprises, among other things, a compressor 29, an accumulator tank 30 and a valve housing 31.

As the second piston surface 25 of the piston valve 22 has a slightly smaller diameter than the first piston surface 23, the piston valve will be able to react during engine braking and open the bypass 21 past the exhaust braking throttle 16 in the event of an exhaust gas pressure acting against the first piston surface that is less than the pressure that is to be found in the compressed air pipe 29 and thus acts against the second piston surface 25. For example, the piston surface 23 can have a diameter of ninety millimeters while the piston surface 25 has a diameter of eighty-four millimeters, whereby the piston valve 22 can react to an exhaust gas pressure which is approximately fifteen percent lower than the system pressure.

Figure 2:
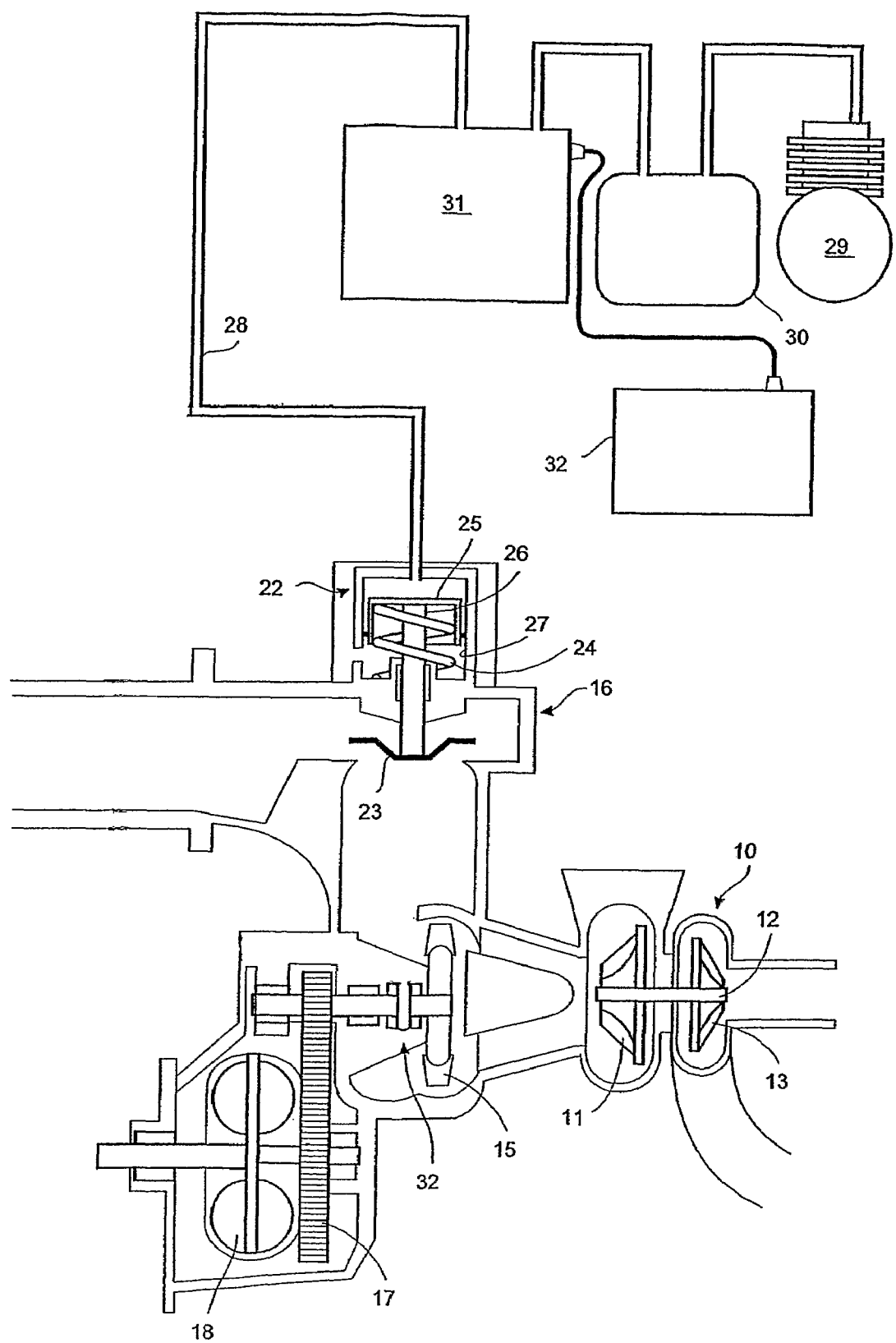

The valve unit 31 provides overpressure that can vary from the standby level of 0.5 bar overpressure to a higher level that can be regulated in relation to the required engine braking effect. For this purpose, the valve unit is connected to an engine control unit 32 as shown in FIG. 2 that is arranged to regulate the higher level of overpressure with regard to various parameters. For example, information about the brake pedal pressure and ABS system may be monitored so that the braking power is optimized in relation to the operation of the engine and to the state of the road.

As the second piston surface 25 of the piston valve 22 has a slightly smaller diameter than the first piston surface 23, the piston valve will be able to react during engine braking and open the bypass 21 past the exhaust braking throttle 19 in the event of an exhaust gas pressure acting against the first piston surface that is less than the pressure that is to be found in the compressed air pipe 29 and thus acts against the second piston surface 25. For example, the piston surface 23 can have a diameter of ninety millimeters while the piston surface 25 has a diameter of eighty-four millimeters, whereby the piston valve 22 can react to an exhaust gas pressure which is approximately fifteen percent lower than the system pressure.

A state of equilibrium gives:

$$P_m = P_s \cdot \frac{A_{25}}{A_{23}} = P_{control} \cdot \text{constant.}$$

The control pressure, $P_{control}$, is adjustable and is adjusted by the valve unit 31. Since the back pressure is directly proportional to the control pressure, the back pressure will be changed when the control pressure is changed.

FIG. 2 shows a variation of the invention in which the exhaust brake regulator 16 is designed in a different way to that shown in FIG. 1. Thus the exhaust pipe is L and the piston valve 22 is set in the angle between the two parts of the pipe. In this case, the throttle 19 and the bypass 21 are not needed, as the changeover from normal operation to exhaust braking is carried out by the piston valve 22 being moved from an inner inactive position to an outer active position. In this position, the piston surface 23 blocks off the exhaust pipe with a pressure that is determined by the valve housing 31 and the engine control unit 40, so that excess pressure can leak past the piston surface 23. The variant of the invention shown in FIG. 2 is less expensive to implement than the solution shown in FIG. 1, but does result in a greater pressure loss in the exhaust pipe.

An advantage of the arrangement according to the invention is that the braking effect of the engine brake can be regulated. This means that it is possible to obtain different braking effects at different engine speeds. This adjustable braking effect can, for example, be used to reduce the fuel consumption and to increase driving comfort. These side effects are, of course, also obtained if the exhaust back pressure is regulated in an ordinary turbo engine or aspirating engine.

With the modern control units that are on current engines, this is possible to achieve, and mechanical components are available that are sufficiently quick to be able to achieve the required back pressure. In the example of the regulation system disclosed herein, an indirect setting of the back pressure is carried out by varying the feed pressure to the EPG. This feed pressure gives rise to a predetermined back pressure. An alternative way of controlling the back pressure is to mount a pressure sensor in the collector housing and to measure the pressure and regulate the feed pressure to the air throttle (the EPG) by means of the control unit in such a way that the required back pressure is obtained. This method is, however, more complicated and more expensive than the indirect method. Practical tests have shown that for a normal engine size for heavy trucks, it is almost possible to achieve a constant braking moment over a very large range of engine speeds using the disclosed arrangement.

The invention is not to be regarded as being limited to the embodiments described above, a number of further variants and modifications being possible within the framework of the following patent claims.

The invention claimed is:

1. A method for providing stress-limited engine braking control to a turbocompound type internal combustion engine, comprising: providing an exhaust system in association with a turbocompound type internal combustion engine that ducts an exhaust gas flow from the engine and which further comprises a supercharger turbine that drives a compressor for engine combustion air to the engine; configuring an exhaust turbine located in the exhaust system downstream of the supercharger turbine to extract residual energy from the exhaust gas flow utilizing a transmission coupled to a crank shaft of the combustion engine and further including an exhaust braking throttle downstream of the exhaust turbine; and variably controlling the configuration of the exhaust braking throttle utilizing a pressure-controlled exhaust pressure regulator that causes variable configuration of the exhaust braking throttle in dependence upon the currently occurring engine speed.

2. An arrangement for a turbocompound type internal combustion engine, comprising: an exhaust system for ducting the engine's exhaust gases and including a supercharger turbine that drives a compressor for combustion air to the engine; an exhaust turbine located in the exhaust system downstream of the supercharger turbine and configured to extract residual energy from an exhaust flow of the engine, via transmission to the combustion engine's crank shaft; the exhaust system further comprises an exhaust braking throttle placed downstream of the exhaust turbine; and the exhaust braking throttle comprises a pressure-controlled exhaust pressure regulation means for enabling variable regulation of an exhaust braking pressure in at least one through-put setting in addition to steps "off" and "on," the exhaust pressure regulation means being provided with means for adapting the exhaust braking pressure to the engine speed.

3. The arrangement as recited in claim 2, wherein the exhaust braking throttle further comprises an exhaust throttle placed in the exhaust system downstream of the exhaust turbine and a parallel bypass regulated by the exhaust pressure regulator.

4. The arrangement as recited in claim 2, wherein the exhaust pressure regulation means consists of a piston valve comprising a first piston surface acted upon by the exhaust pressure when the exhaust braking throttle is closed, and a second opposing piston surface permanently connected to the first piston surface, which second piston surface is acted upon by a control pressure.

* * * * *